(12) United States Patent
Erlmann

(10) Patent No.: US 6,969,322 B2
(45) Date of Patent: Nov. 29, 2005

(54) FLANGE YOKE

(75) Inventor: Nikolaus Martin Erlmann, Düsseldorf (DE)

(73) Assignee: Spicer Gelenkwellenbau GmbH & Co. KG, Essen (DE)

( * ) Notice: Subject to any disclaimer, the term of this patent is extended or adjusted under 35 U.S.C. 154(b) by 13 days.

(21) Appl. No.: 10/642,474

(22) Filed: Aug. 15, 2003

(65) Prior Publication Data

US 2004/0121844 A1 Jun. 24, 2004

Related U.S. Application Data

(63) Continuation of application No. PCT/EP02/00354, filed on Jan. 16, 2002, now abandoned.

(30) Foreign Application Priority Data

Feb. 17, 2001 (DE) .............................. 101 07 606

(51) Int. Cl.$^7$ ............................................. F16D 3/40
(52) U.S. Cl. ..................................... 464/135; 403/298
(58) Field of Search ............................. 464/134, 135; 403/57, 408.1, 364, 298

(56) References Cited

U.S. PATENT DOCUMENTS 2,439,231 A * 4/1948 Whitehouse
3,355,195 A * 11/1967 Takayanagi et al. ........ 403/364
3,589,142 A 6/1971 Lecomte
4,167,859 A 9/1979 Okuda
4,637,807 A 1/1987 Koelling, Sr.
5,035,676 A 7/1991 Koelling, Sr.
6,056,644 A 5/2000 Lindenthal

FOREIGN PATENT DOCUMENTS

| DE | 195 37 248 | 4/1997 |
|---|---|---|
| GB | 824931 | 12/1959 |
| JP | 03-009118 | 1/1991 |

* cited by examiner

*Primary Examiner*—Greg Binda
(74) *Attorney, Agent, or Firm*—MacMillan, Sobanski & Todd, LLC

(57) ABSTRACT

A flange yoke includes a base element having a flange plate. A first bearing portion, formed integrally with the flange plate and projecting from a first end face of the flange plate, has a first bearing bore. A first attachment face is provided on the first end face. A first abutment face extends from the first attachment face. A connection face is arranged on a second end face of the flange plate, with which the base element is detachably connectable to a mating flange. A bearing element having a flange portion has a second attachment face that abuts the first attachment face 10 and a second abutment face that abuts the first abutment face. The bearing element includes a second bearing portion having a second bearing bore and is detachably connected by attachment screws to the base element.

31 Claims, 9 Drawing Sheets

FLANGE YOKE

CROSS REFERENCE TO RELATED APPLICATION

This application is a continuation of International Application No. PCT/EP02/00354, filed Jan. 16, 2002, now abandoned, which claims priority from German Patent Application No. 10107606.1, filed Feb. 17, 2001. The disclosures of both applications are incorporated herein by reference.

BACKGROUND OF THE INVENTION

The invention relates to a flange yoke for universal joints, especially for universal joints for the transmission of high torques.

German Patent Application No. 2,636,752 A1 discloses a universal joint with two joint yokes connected to each other by means of a journal cross. The journal cross comprises four journals arranged in two pairs on a common journal axis, wherein the journal axes of the two pairs intersect each other perpendicularly. The yokes comprise, respectively, two bearing elements in which, respectively, a bearing bore for receiving a journal of the journal cross is provided. The bearing elements of a yoke are connected by means of attachment screws to a mating flange. The bearing elements have, respectively, two through bores, extending parallel to a longitudinal axis of the yoke. In the mating flange, threaded bores are provided in which attachment screws, passed through the through bores, rest. The cross-sectional area of the bearing elements in the plane formed by the journal cross is, because of the through bores, weakened compared to a non-split yoke. This leads to the fact that the maximal transmissible rotational torque is lower. To achieve the same torque capacity as in non-split yokes, the bearing elements have to be formed larger, whereby the rotational diameter of the universal joint would be enlarged.

German Patent Application No. 4,313,141 C2 shows a flange yoke for universal joints. The flange yoke is split along a plane extending along the longitudinal axis and arranged perpendicular to a bore axis of the bearing bores by means of abutment faces into two yoke halves. The abutment faces of the two yoke halves are provided with respective toothings that are formed complementary to each other. On an end face facing away from the bearing portions, the yoke halves have a Hirth-end face serration, by which the yoke halves are separately connectable to a mating flange of a shaft. For this, the yoke halves have through bores for passing-through connection screws.

SUMMARY OF THE INVENTION

The object of the present invention is to provide a flange yoke for universal joints which, with a split flange yoke structure, enables the highest possible torque transmission and which can be pre-assembled. The object is solved according to the invention by a flange yoke with a base element defining a longitudinal axis, a flange plate with a first end face and a second end face, a first bearing portion formed integrally with the flange plate and projecting from the first end face of the flange plate and having a first bearing bore with a first bore axis intersecting perpendicularly the longitudinal axis, a first attachment face provided at the first end face of the flange plate, a first abutment face extending from the first attachment face and arranged on a plane intersecting with its extension the first bore axis, as well as a connection face arranged on the second end face of the flange plate and by which the base element is connectable to a mating flange, and with a bearing element having a flange portion that forms a second attachment face, abutting the first attachment face of the base element and forms a second abutment face, abutting the first abutment face of the base element, as well as a second bearing portion having a second bearing bore with a second bore axis arranged co-axially to the first bore axis, wherein the bearing element is detachably connected by attachment screws to the base element.

Thus, it is achieved that the cross-sectional areas of the first bearing portion and of the second bearing portion in the plane formed by the journals of a journal cross of a universal joint is not additionally weakened by bores for attachment screws. Furthermore, no abutment faces have to be provided on the sides of the bearing portions arranged distanced from the flange plate. It is prevented that screw heads on the end of the bearing portions facing away from the flange plate collide with components of the other flange yoke of the universal joint at larger bending angles.

To prevent torsional stresses in the attachment screws, the attachment screws may be formed as expansion screws.

For connecting the base element to the bearing element in the flange portion of the bearing element, first blind holes with internal threads may be provided, extending parallel to the longitudinal axis.

For each first blind hole, a first through bore is arranged in the flange plate of the base element which, starting from the connection face, ends in the first attachment face, wherein the first attachment screws are passed through the first through bores and rest in the first blind holes.

Preferably, the first attachment screws have screw ends taken up countersunk in the connection face.

Furthermore, means can be provided that serve on the one hand, to connect the base element to the bearing element and, on the other hand, to prevent radial movements between the base element and the bearing element. For this, it can be provided that in the flange portion of the bearing element, third blind holes are provided, extending parallel to the longitudinal axis and merging, respectively, in a blind hole with internal thread that, for each blind hole, a third though bore is arranged in the flange plate of the base element which, starting from the connection face, ends in the first attachment face, wherein the third through bore and the third blind hole have together a conical internal face, into which a clamping sleeve with a conical outer circumferential face is inserted, and wherein third attachment screws are, respectively, passed through a through bore of a clamping sleeve and rest, respectively, in one of the blind holes with internal thread.

The third attachment screws may have screw ends taken up countersunk in the connection face.

Furthermore, the first attachment faces and the second attachment face have means for the transmission of torque around the longitudinal axis.

The means for the transmission of torques around the longitudinal axis can be formed in such a way that the first attachment face has a toothing and that the second attachment face has a toothing, wherein the toothings are formed complementary to each other.

The teeth of the toothing of the first attachment face and the teeth of the toothing of the second attachment face extend parallel to the bore axis. Any other angle relative to the bore axis is also possible. It can also be a Hirth-end face serration.

So that the bearing element can be supported radially inwards towards the longitudinal axis, in the first attachment face and in the second attachment face, at least one key and groove connection can be provided.

For connecting the base element to the bearing element, it can be further provided that in the flange portion of the bearing element, second blind holes with internal thread are provided, extending parallel to the second bore axis, that for each second blind hole, a second through bore is arranged in the flange plate of the base element which, starting from the second abutment face, ends in an outer circumferential face of the base element, wherein second attachment screws are passed through the second through bores and rest in the second blind holes.

Preferably, the second attachment screws have screw ends taken up countersunk in the outer circumferential face.

The first abutment face and the second abutment face have, respectively, means for the transmission of forces in the plane of the abutment faces which, respectively, can be represented by a toothing in the first abutment face and by a toothing in the second abutment faces, formed complementary to each other.

The teeth of the toothing of the first abutment face and the teeth of the toothing of the second abutment face extend parallel to the longitudinal axis. The teeth of the toothing of the first abutment face and the teeth of the toothing of the second abutment face intersect perpendicularly the longitudinal axis with a distance in between. Besides these orientations of the teeth of the toothings, the teeth can, however, take up any angle between 0° to 180° relative to the plane formed by the bore axis and the longitudinal axis.

The means for the transmission of forces in the plane of the abutment face can also be formed in such a way that in the second abutment face, recesses are provided in which, respectively, a fitting member rests, supported on the first abutment face.

Preferably, the connection face has centering means for centering the flange plate relative to a longitudinal axis of the mating flange. The centering means can be formed by a self-centering end face serration, especially a Hirth-end face serration.

The flange yoke can be detachably connected by means of connection screws with a mating flange. A welding connection is also possible.

For connecting the flange yoke to a mating flange, it can be provided that in the flange plate of the base element, through bores are provided which are equally distributed on a partial circumference around the longitudinal axis in the area of the first attachment face and extend parallel to the longitudinal axis and through which a first partial number of connection screws is passed that for each through bore, a blind hole with internal thread is arranged in the bearing element, wherein the blind holes extend in the extension of the respective through bore of the base element and starting from the second attachment face, and wherein the first partial number of connection screws are screwed into the blind holes, that in the flange plate of the base element, blind holes with internal thread are provided which are equally distributed on the residual partial circumference around the longitudinal axis in the area of the first bearing portion and into which a second partial number of connection screws is screwed.

Alternatively, it can be provided that in the flange plate of the base element, through bores are provided, equally distributed on a partial circumference around the longitudinal axis in the area of the first attachment face and extending parallel to the longitudinal axis and through which a first partial number of connection screws is passed, hat for each through bore, a through bore is arranged in the bearing element, wherein the through bore extends in the bearing element in extension of the respective through bore of the base element and which, starting from the second attachment face, ends in a second clamping face and wherein the first partial number of connection screws is, starting from the connection face, passed through the through bore of the base element and through the through bore in the bearing element and is screwed into the internal threads of a thread body, supported on the second clamping face, that in the flange plate of the base element, through bores are provided, equally distributed on the residual partial circumference around the longitudinal axis in the area of the first bearing portion, extending parallel to the longitudinal axis and which, starting from the connection face, ends in a first clamping face, wherein the second partial number of connection screws is, starting from the connection face, passed through the through bores and is screwed into the internal threads of a thread body supported on the first clamping face.

In this case, the first clamping face is formed by a first recess in the outer circumferential face of the base element.

The second clamping face is formed by a second recess in the outer circumferential face of the bearing element. The thread body can be formed as a ring supported on the first clamping face and on the second clamping face and which is split in a plane which is formed by the longitudinal axis and the first bore axis. The annular elements take up, besides the function of the absorption of the clamping force in the direction of the longitudinal axis, the radial retainment of the bearing element relative to the base element, on the one hand by means of the form-fitting abutment of the annular elements on their inner circumferential faces with the bearing element or the base element as well as by means of frictional grip.

Means can be provided to balance the load distribution between the screw connections of the third attachment screws and the screw connections of the third attachment screws. The first attachment screws can, for this, be formed reinforced in the area of the shaft. The load carrying of the screw connections of the third attachment screws can be adjusted, because of this, to the load carrying of the screw connections of the first attachment screws such that the diameter or the length of the clamping sleeve is varied or an expansion portion is provided on the first attachment screws, which diameter can be varied.

Various objects and advantages of this invention will become apparent to those skilled in the art from the following detailed description of the preferred embodiments, when read in light of the accompanying drawings.

BRIEF DESCRIPTION OF THE DRAWINGS

FIG. 5 is an exploded view of a third embodiment of a flange yoke, wherein the first abutment face and the second abutment face have respective toothings with teeth that intersect the longitudinal axis with a distance in-between.

DETAILED DESCRIPTION OF THE PREFERRED EMBODIMENTS

Figure 1:
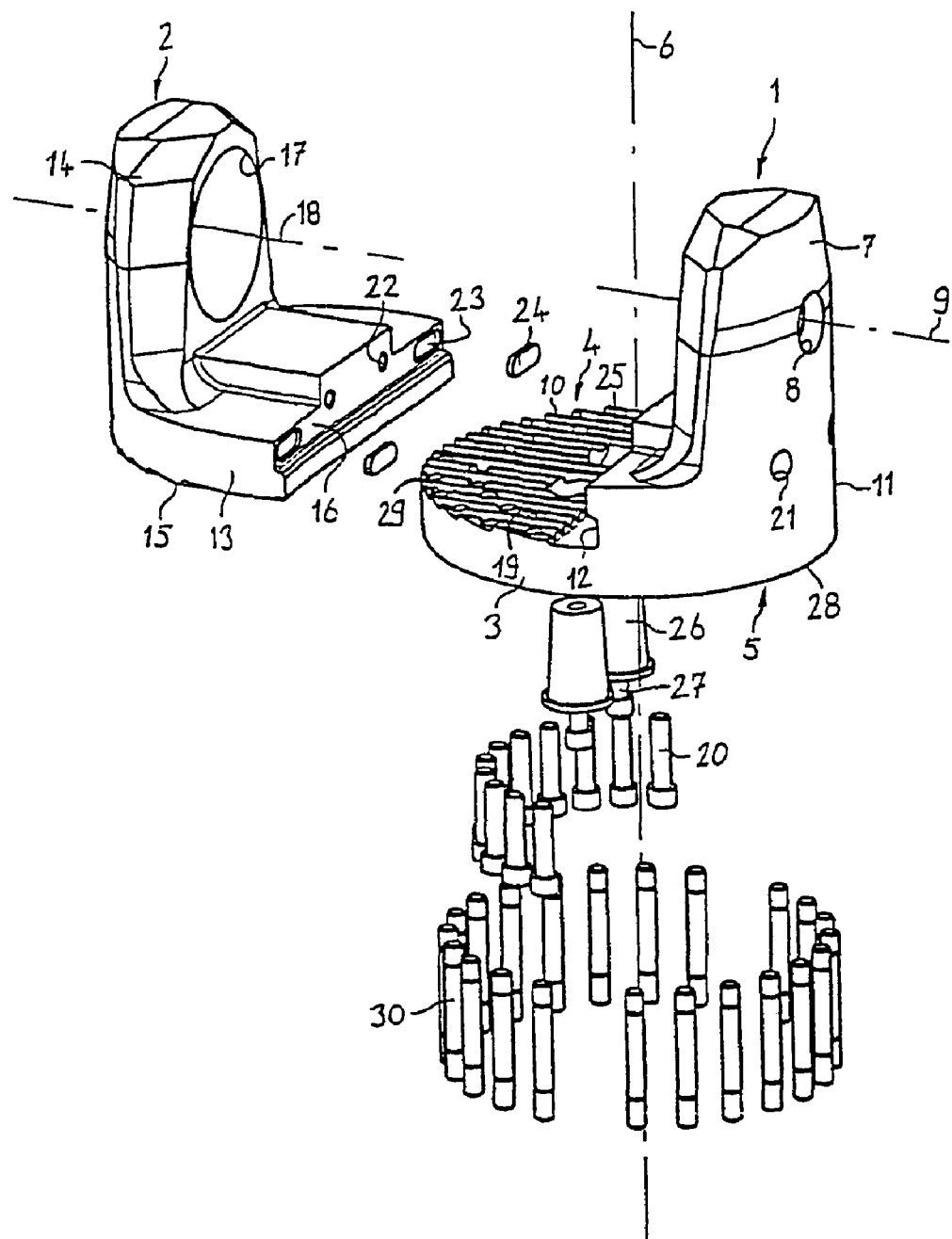
FIG. 1 is an exploded view of a first embodiment of a flange yoke according to the invention.
Figure 2:
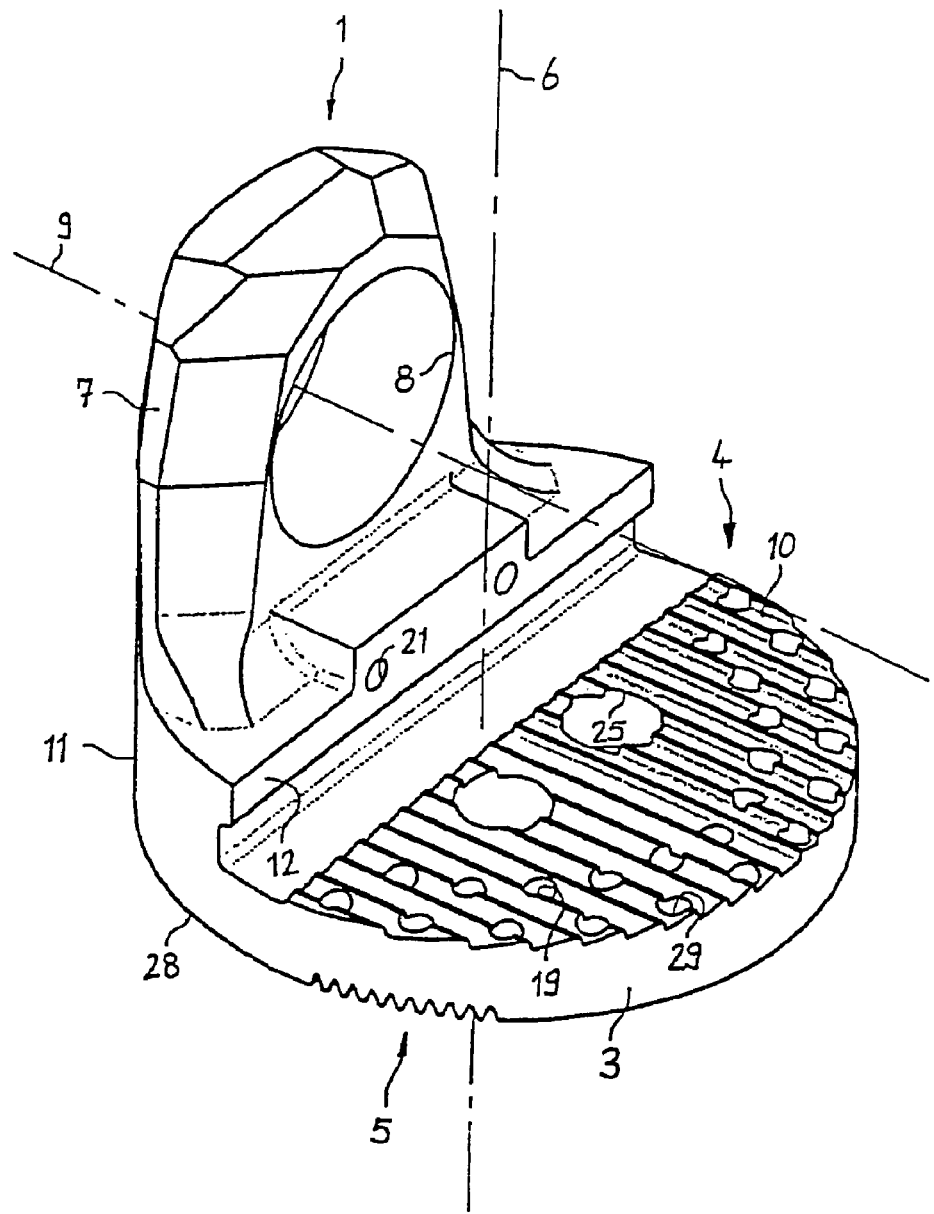
FIG. 2 is a perspective view of the base element of the first embodiment of the flange yoke illustrated in FIG. 1.
Figure 3:
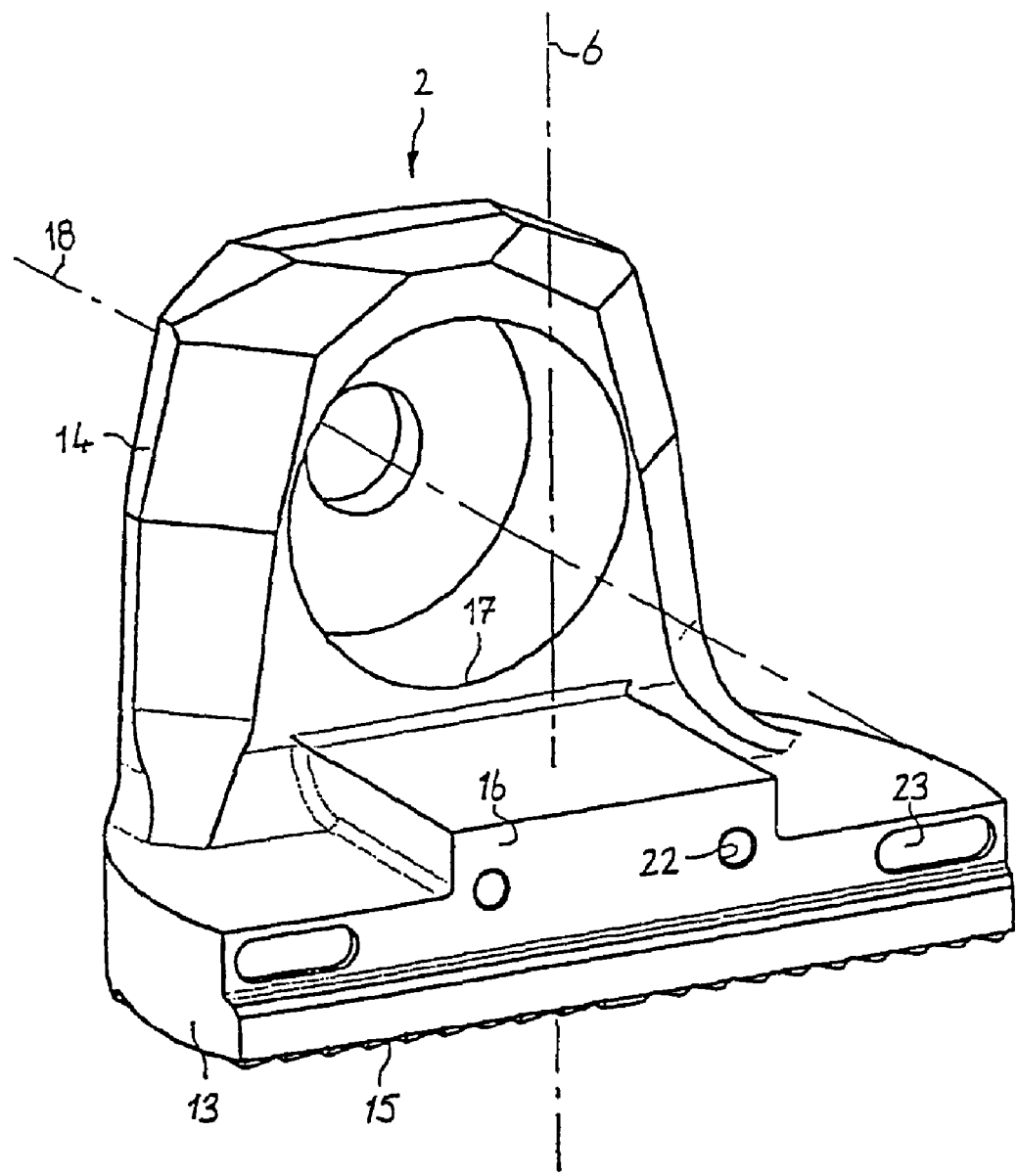
FIG. 3 is a perspective view of the bearing element of the first embodiment of the flange yoke illustrated in FIG. 1.

FIGS. 1, 2, and 3 show the components of a first embodiment of a flange yoke according to the invention and are described together in the following.

The flange yoke includes a base element 1 and a bearing element 2. The base element 1 has a flange plate 3 with a first end face 4 and a second end face 5, wherein the first end face 4 and the second end face 5 are arranged perpendicular to a longitudinal axis 6. The base element further has a first bearing portion 7 projecting from the first end face 4. In the first bearing portion 7, a first bearing bore 8 with a first bore axis 9 is arranged, wherein the first bore axis 9 intersects perpendicularly the longitudinal axis 6. The first end face 4 has a first attachment face 10 that is delimited by an outer circumferential face 11 of the base element 1 arranged co-axially to the longitudinal axis 6 and by a first abutment face 12 extending parallel to the longitudinal axis 6 and arranged on the first bearing portion 7. The first attachment face 10 has a spur gear toothing with teeth that extend parallel to the first bore axis 9.

The bearing element 2 has a flange portion 13 and a second bearing portion 14. The flange portion 13 forms a second attachment face 15 abutting, in the assembled condition of the flange yoke, the first attachment face 10 of the base element 1 and having a toothing that is formed complementary to the toothing of the first attachment face 10. Furthermore, the flange portion 13 forms a second abutment face 16 extending, corresponding to the first abutment face 12 of the base element 1, parallel to the longitudinal axis 6 and that abuts the same in the assembled condition of the flange yoke. In the second bearing portion 14, a second bearing bore 17 with a second bore axis 18 is provided, wherein the second bore axis 18 is arranged co-axially to the first bore axis 9. The first attachment face 10 and the second attachment face 15 thus provide a means for the transmission of torque around the longitudinal axis.

To connect the base element 1 and the bearing element 2 to form a flange yoke, in the flange plate 3 of the base element 1, first through bores 19 are provided that extend parallel to the longitudinal axis 6, and that, starting from the second end face 5, end in the first attachment face 10 and are equally distributed on a partial circumference around the longitudinal axis 6. For each of the first through bores 19, respectively, a first blind hole is arranged in the flange portion 13 of the bearing element 2. The first blind holes extend in extension of the first through bores 19 parallel to the longitudinal axis 6 and start from the second attachment face 15. For the attachment of the bearing element 2 on the base element 1, first attachment screws 20, such as the illustrated expansion screws, are passed that start from the second end face 5, extend through the first through bores 19, and are screwed into the first blind holes of the bearing element 2. The screw connections with the first through bores 19, with the first blind holes and the first attachment screws 20 are preferably arranged, when viewed in longitudinal direction, in the area of the second bearing portion 14 and, therefore, in the highly loaded area of the flange yoke.

The base element 1 has, further, two second through bores 21 that extend parallel to the first bore axis 9, starting from the outer circumferential face 11 and ending in the first abutment face 12. For each second through bore 21, respectively, a second blind hole 22 is arranged that extends in extension of the respective second through bore 21, starting from the second abutment face 16. The second blind holes 22 are provided with internal threads. Second attachment screws (not shown) can be passed for the attachment of the bearing element 22 on the base element 1 that start from the outer circumferential face 11, extend through the second through bores 21, and are screwed into the second blind holes 22 with internal threads.

The second abutment face 16 has also recesses 23 into which respective fitting members 24 are inserted. The fitting members 24 absorb circumferential forces and prevent an over-determination from being given to the toothings of the first attachment face 10 and the second attachment face 15.

In the flange plate 3 of the base element 1, furthermore, third through bores 25 are provided that are arranged within a partial circumference on which the first through bores 19 are arranged. For each third through bore 25, respectively, a third blind hole is arranged in the flange portion 13 of the bearing element 2. The third blind holes extend, respectively, in extension of a third through bore 25 and start from the second attachment face 15. The third through bores and the third blind holes form together a conical internal face in which a sleeve 26 with tapered outer face rests to ensure a radial retainment of the bearing element 2 attached on the base element 1. The third blind holes merge in blind holes with smaller diameter and internal thread. The sleeves 26 have, furthermore, through bores arranged in extension of the blind holes with internal thread. After the sleeves 26 are, starting from the second end face 5, passed through the third through bores 25 into the third blind holes, third attachment screws 27 can be passed through the through bores of the sleeves 26 and screwed into the blind holes with internal thread of the bearing element 1.

To be able to connect the flange element to a mating flange, the second end face 5 forms a connection face 28 with a Hirth-end face serration (partially shown). The base element 1 has through bores 29 for connection screws 30 arranged equally distanced on a partial circumference around the longitudinal axis 6, extending parallel to the longitudinal axis 6 and ending, starting from the connection face 28, in the first attachment face 10. On the residual partial circumference around the longitudinal axis 6, blind holes with internal threads are arranged equally distanced, which also extend parallel to the longitudinal axis 6, start from the connection face 28, and are arranged, when viewed in the longitudinal direction, in the area of the first bearing portion 7. For each of the through bores 29 for the connection screws 30, respectively, a blind hole is arranged in the bearing element 2 that extends in extension of the through bores 29, starting from the second attachment face 15. The blind holes have, respectively, an internal thread. The connection screws 30 can, therefore, either be passed through the through bore 29 of the connection screws 30 and screwed into the blind holes with internal thread of the bearing element 2, or be directly screwed into the blind holes of the base element 1. The connection screws 30 project, thus, beyond the connection face 28 and can be passed through corresponding through bores of a mating flange and can be secured by means of nuts. Preferably, the first attachment screws 20 have screw ends taken up countersunk in the connection face 28. Also, the connection face preferably has a centering means for centering the flange plate relative to a longitudinal axis of the mating flange. The centering means can be formed by a self-centering end face serration, especially the illustrated Hirth-end face serration.

Figure 4:
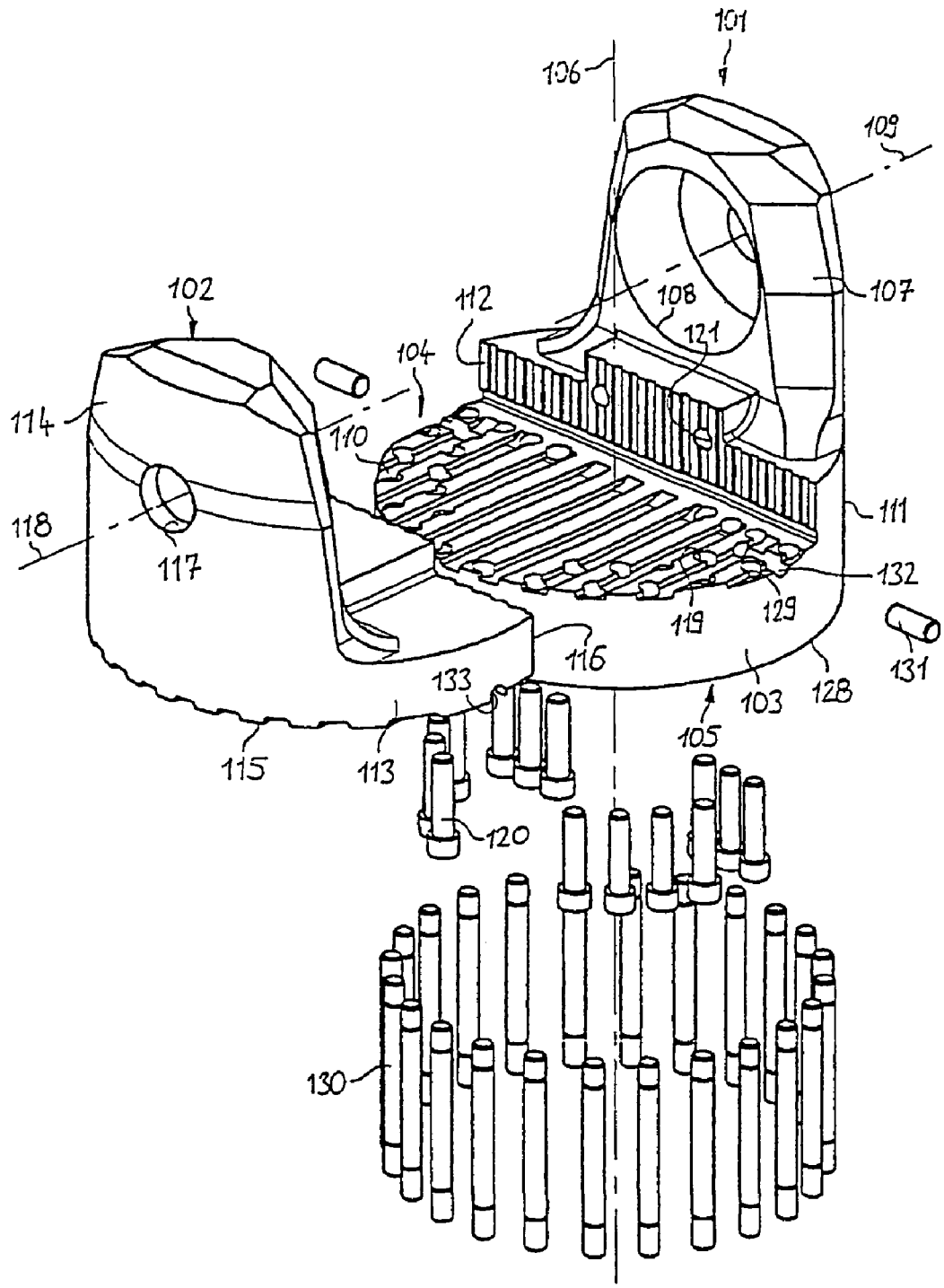
FIG. 4 is an exploded view of a second embodiment of a flange yoke according to the invention, wherein the first abutment face and the second abutment face have respective toothings with teeth that extend parallel to the longitudinal axis.
Figure 5:
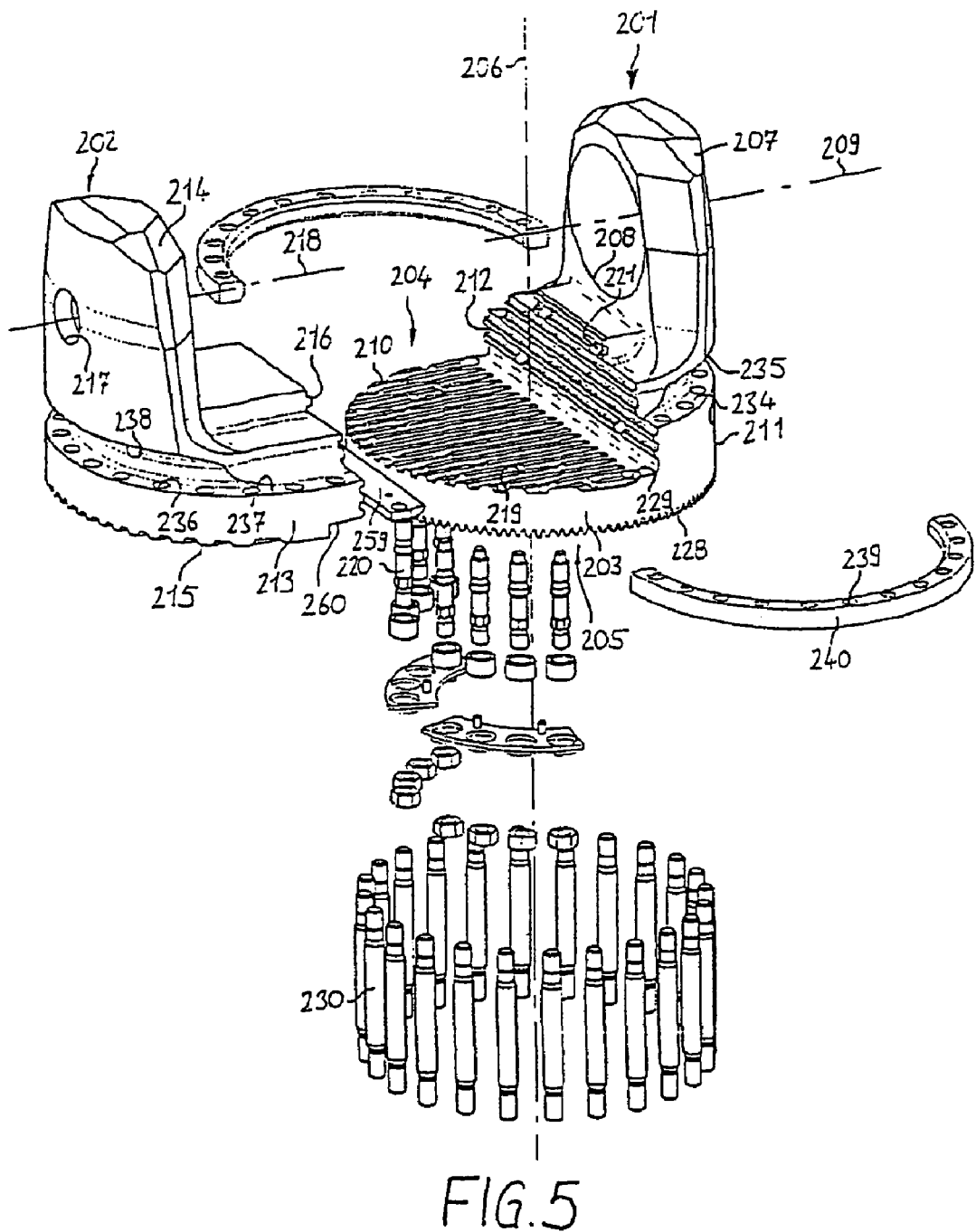

FIG. 4 shows a second embodiment of a flange yoke similar to that of FIGS. 1 to 3, wherein corresponding components are provided with reference numerals that are increased by the value 100 and are as described with FIGS. 1 to 3.

The first abutment face 112 and the second abutment face 116 have respective toothings that are formed complementary to each other and have teeth that extend parallel to the longitudinal axis 106.

The radial retainment of the bearing element 102 on the base element 101 is achieved in this embodiment by means of two bolts 131 that rest, respectively, in a first groove 132 that extends radially in the first attachment face 110 and in a second groove 133 that extends in the second attachment face 115.

FIGS. 5, 6, 7, and 8 show a third embodiment of a flange yoke similar to that of FIGS. 1, 2 and 3, wherein corresponding components are provided with reference numerals that are increased by the value 200 and are as described with FIGS. 1 to 3. Furthermore, FIGS. 5 to 8 are described together in the following.

The first abutment face 212 and the second abutment face 216 have respective toothings having teeth that intersect the longitudinal axis 206 with a distance in-between. Therefore, bearing forces acting on the first bearing bore 208 and on the second bearing bore 217 and resulting in tipping forces in the plane of the abutment faces, are absorbed by the toothings on the first abutment face 212 and on the second abutment face 216.

Figure 6:
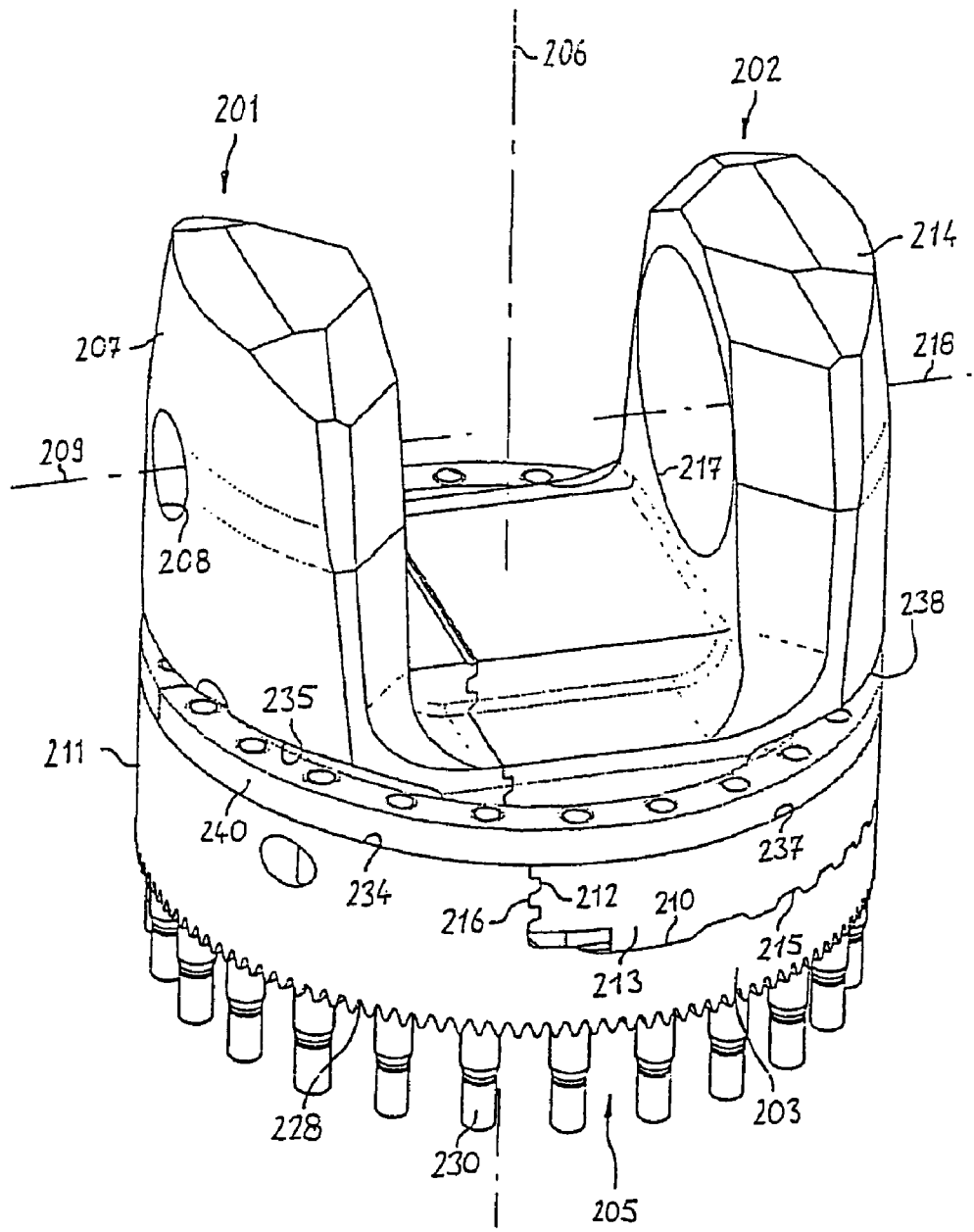
FIG. 6 a perspective view of the third embodiment of the flange yoke illustrated in FIG. 5 shown assembled.
Figure 7:
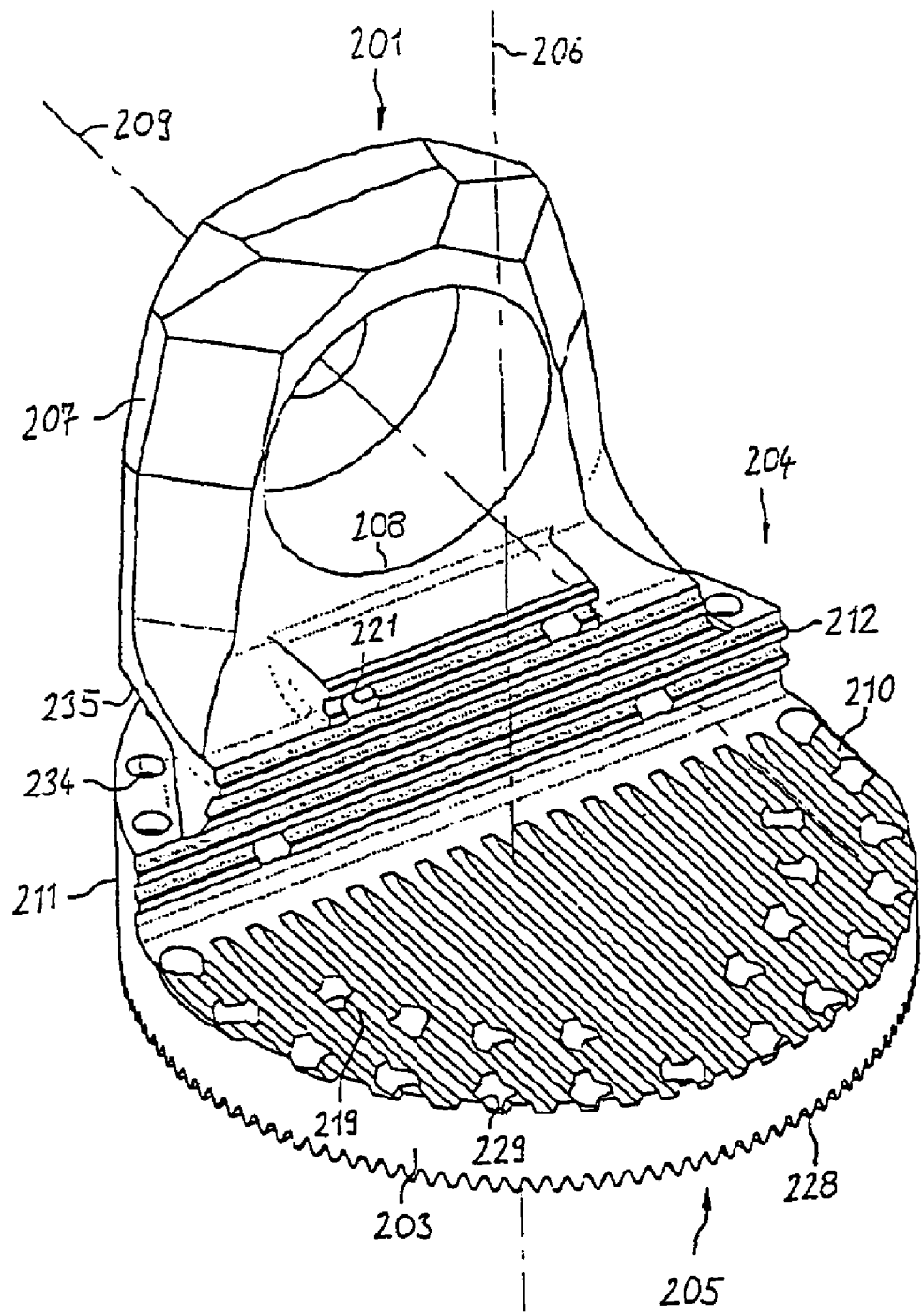
FIG. 7 is a perspective view of the base element of the third embodiment of the flange yoke illustrated in FIG. 5.
Figure 8:
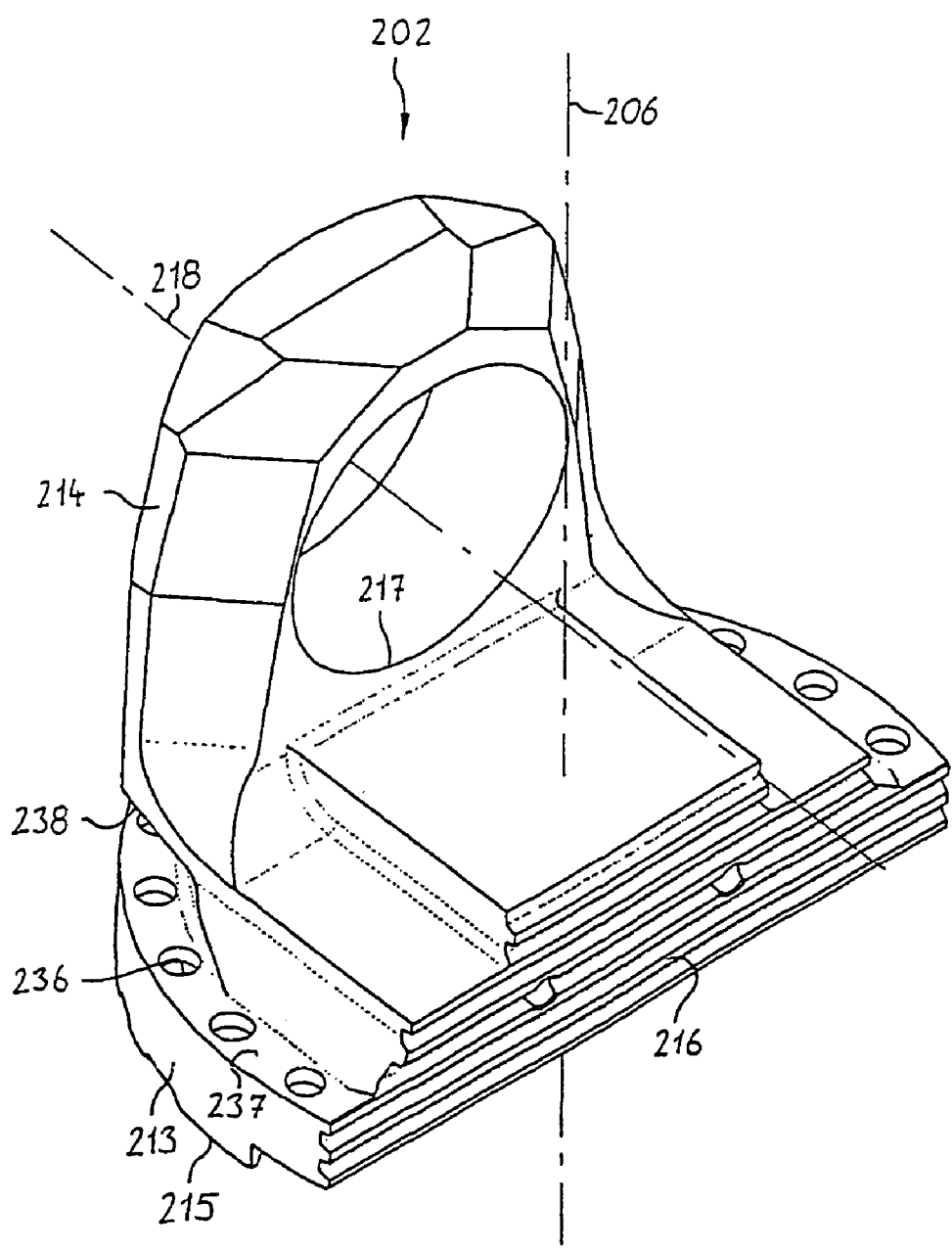
FIG. 8 is a perspective view of the bearing element of the third embodiment of the flange yoke illustrated in FIG. 5.

For the connection of the flange yoke to a mating flange, the base element 201 has through bores 229 for the connection screws 230, which are equally distributed over a circumference around the longitudinal axis 206. A first partial number of the through bores 229 are arranged, when viewed in longitudinal direction in the area of the first attachment face 210, so as to extend from the connection face 228 to the first attachment face 210. A second partial number of the through bores 229, which are arranged in the area of the first bearing portion 207 when viewed in longitudinal direction, start from the connection face 228 and end in a first clamping face 234 that is formed by a first recess 235 arranged on a circumference around the longitudinal axis 206. For each of the first partial number of the through bores 229 in the area of the first attachment face 210, a through bore 236 is arranged in the bearing element 202 that extends, respectively, in extension of such through bores 229 of the base element 201. The through bores 236 in the bearing element 202 start from the second attachment face 215 and end in a second clamping face 237 that is formed by a second recess 238 arranged on a circumference around the longitudinal axis 206. The first clamping face 234 and the second clamping face 237 together form an annular clamping face. A first partial number of the connection screws 230 can, therefore, be passed through the first partial number of the through bores 229 in the base element 201 and through the through bores 236 in the bearing element 202 to the second clamping face 237. A second partial number of the connection screws 230 can be passed through the second partial number of the through bores 229 in the area of the first bearing portion 207 to the first clamping face 234. All of the connection screws 230 can be screwed into the internal threads 239 of annular elements 240, as shown in FIG. 6. Two annular elements 240 are provided that extend over half of the circumference around the longitudinal axis 206 and are respectively supported on the first clamping face 234 as well as on the second clamping face 237. The two annular elements 240 abut each other in a plane that is formed by the longitudinal axis and by the bores axes. The annular elements 240 provide the function of absorption of the clamping force in the direction of the longitudinal axis 206, and also the function of radial retainment of the bearing element 202 relative to the base element 201. This is accomplished, on the one hand, by means of a form-fitting contact of the annular elements 240 with the bearing element 202 and the base element 201 and, on the other hand, by means of a frictional contact.

In this third embodiment, furthermore, a pressure plate 259 is provided that is supported, on the one hand, on the first abutment face 212 of the base element 201 and, on the other hand, on a face of a recess 260 of the bearing element 202, wherein the recess starts from the second abutment face 216. By means of the pressure plate 259, manufacturing inaccuracies between the toothings of the first abutment face 212 and the second abutment face 216 can be absorbed. The pressure plate 259 can be adapted during the assembly of the flange yoke. The circumferential forces are transmitted by means of the pressure plate 259.

Figure 9:
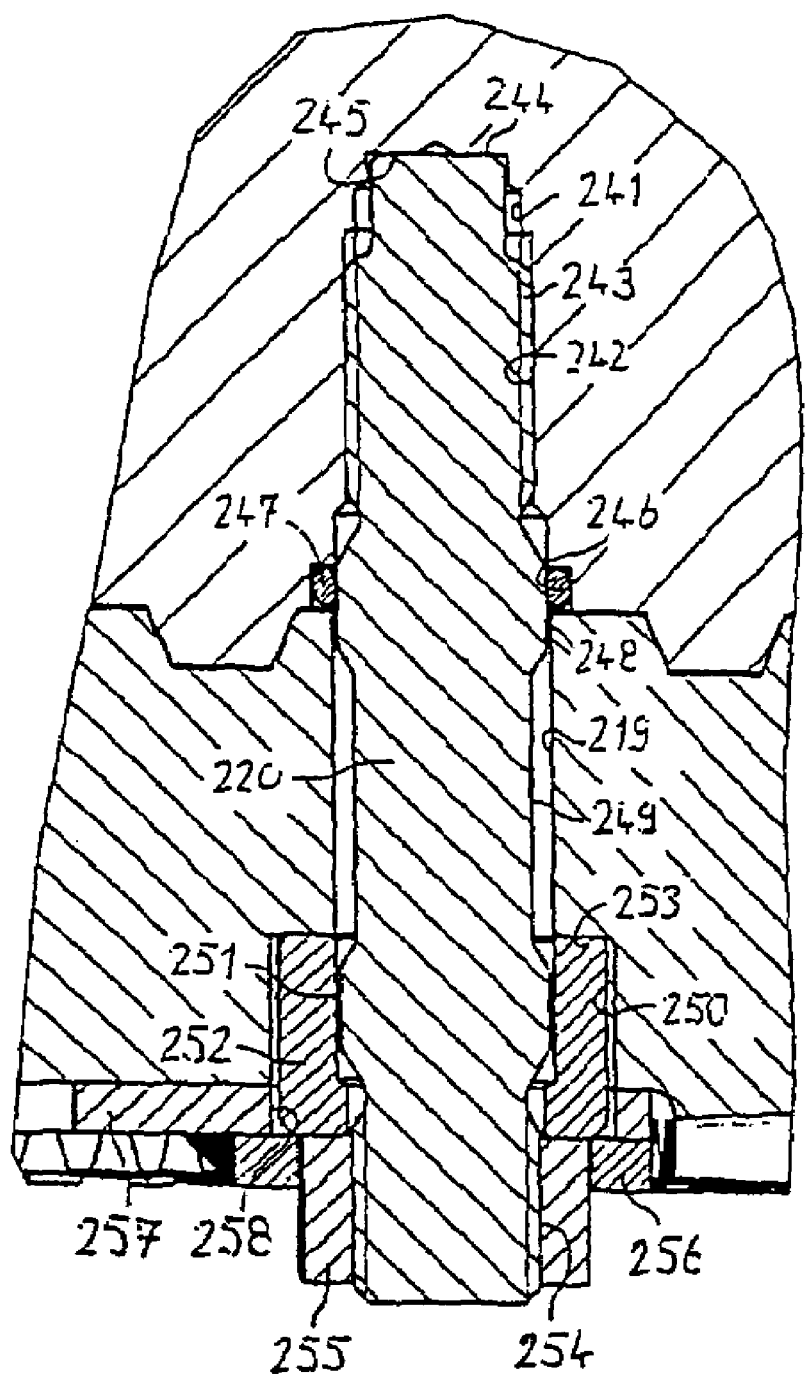
FIG. 9 is a sectional elevational view of the third embodiment of the flange yoke illustrated in FIG. 5, wherein the intersecting plane extends along the longitudinal axis and through an attachment screw.

FIG. 9 shows the attachment of the bearing element 202 on the base element 201 in a cross-sectional view. Components that correspond to components of FIGS. 5 to 8 are provided with the same reference numerals and are as described with FIGS. 5 to 8.

The bearing element 202 has a first blind hole 241 that is arranged in extension of a first through bore 219 of the base element 201. The first blind hole 241 has an internal thread 242. The screwed-in first attachment screw 220 has, in this area, an external thread 243. The first attachment screw 220 abuts, with an end face 244, a base face 245 of the first blind hole 241. The screw connection in the area of the internal thread 242 and of the external thread 243 is, therefore, not tensioned. The first attachment screw 220 is only loosely screwed in. The first blind hole 241 continues into a bore portion 246 with an enlarged diameter and without an internal thread. The bore portion 246 ends in the second attachment face 215. In the bore portion 246, a sealing ring 247, in the form of a sealing ring made from an elastomer, is inserted. This also abuts an outer circumferential face 248 of the first attachment screw 220. The first blind hole 241 is, therefore, sealed to the outside so that the penetration of moisture and corrosion are prevented.

Starting from the outer circumferential face 248, first the attachment screw 220 continues into an expansion portion 249 having a smaller diameter. The expansion portion 249 is arranged within the first through bore 219 of the base element 201. The first through bore 219 merges in a bore portion 250 having an enlarged diameter that ends in the connection face 228. In the bore portion 250, the first attachment screw 220 has an outer circumferential face in the form of a hexagon 251. Onto the hexagon 251, a sleeve 252 is moved on, wherein the sleeve 252 is supported on a shoulder 253 in the transition area of the first through bore 219 to the bore portion 250 having the enlarged diameter. In continuation to the hexagon 251, the first attachment screw 220 has a screw end with an external thread 254, onto which a nut 255 is screwed, to be tensioned against the sleeve 252. A ring 256 having an internal hexagon is slid onto the nut 255. The ring 256 is welded to a plate 257. The plate 257 is arranged between the connection face 228 and the ring 256 and has a multitude of bores 258, through which respective first attachment screws 220 are passed. The ring 256 forms, therefore, together with the plate 257, a retainment against rotational displacement.

For detaching of the first attachment screw 220, the end having the external thread 254 and the screwed-on nut 255 retained by the ring 256, is to be removed by means of a gas cutter. By means of the hexagon 251, the screw 220 can then be removed from the first blind hole 241, wherein because of the sealing of the first blind hole 241, corrosion on the threads 242, 243 is prevented.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A flange yoke comprising:
   a base element defining a longitudinal axis and including a flange plate including a first end face and a second end face, a first bearing portion formed integrally with the flange plate and projecting from the first end face of the flange plate and having a first bearing bore defining a first bore axis intersecting perpendicularly the longitudinal axis, a first attachment face provided at the first end face of the flange plate, a first abutment face extending from the first attachment face and arranged on a plane that intersects with its extension the first bore axis, and a connection face that is arranged on the second end face of the flange plate and that is connectable to a mating flange; and
   a bearing element having a flange portion that forms a second attachment face that abuts the first attachment face of the base element, and a second abutment face that abuts the first abutment face of the base element, and a second bearing portion having a second bearing bore defining a second bore axis arranged co-axially to the first bore axis, wherein the bearing element is detachably connected by attachment screws to the base element, the flange portion of the bearing element being provided with first blind holes having internal threads that extend parallel to the longitudinal axis, wherein for each blind hole, a first through bore is arranged in the flange plate of the base element that, starting from the connection face, merges in the first attachment face, and wherein first attachment screws are passed through said first through bores and rest in said first blind holes.

2. A flange yoke according to claim 1, characterized in that the attachment screws are formed as expansion screws.

3. A flange yoke according to claim 1, characterized in that the first attachment screws have screw ends that are countersunk in the connection face.

4. A flange yoke according to claim 1, characterized in that the first attachment face and the second attachment face have means for the transmission of torque around the longitudinal axis.

5. A flange yoke according to claim 4, characterized in that the first attachment face has a toothing and the second attachment face has a toothing, wherein the toothings are formed complementary to each other.

6. A flange yoke according to claim 5, characterized in that teeth of the toothing of the first attachment face and teeth of the toothing of the second attachment face extend parallel to the first bore axes.

7. A flange yoke according to claim 1, characterized in that the first abutment face and the second abutment face have, respectively, means for the transmission of forces in the plane of the abutment faces.

8. A flange yoke according to claim 7, characterized in that the first abutment face and the second abutment face have respective toothings that are formed complementary to each other.

9. A flange yoke according to claim 8, characterized in that teeth of the toothing of the first abutment face and teeth of the toothing of the second abutment face extend parallel to the longitudinal axis.

10. A flange yoke according to claim 8, characterized in that teeth of the toothing of the first abutment face and teeth of the toothing of the second abutment face intersect perpendicularly the longitudinal axis with a distance in between.

11. A flange yoke according to claim 1, characterized in that the connection face has means for centering the flange plate relative to a longitudinal axis of the mating flange.

12. A flange yoke according to claim 11, characterized in that the means for centering is formed by a self-centering spur gear.

13. A flange yoke according to claim 1, characterized in that, in the flange plate of the base element, through bores are provided that are equally distributed on a partial circumference around the longitudinal axis in the area of the first attachment face and extend parallel to the longitudinal axis and through which a first partial number of connection screws are passed, and further that for each through bore, a blind hole with internal thread is arranged in the bearing element, wherein the blind holes extend in the extension of the respective through bore of the base element and start from the second attachment face, and wherein the first partial number of connection screws is screwed into the blind holes, and that in the flange plate of the base element, blind holes with internal threads are provided that are equally distributed on the residual partial circumference around the longitudinal axis in the area of the first bearing portion and into which a second partial number of connection screws is screwed.

14. A flange yoke according to claim 1, characterized in that in the flange plate of the base element, through bores are provided, around the longitudinal axis in the area of the first attachment face and extending parallel to the longitudinal axis and through which a first partial number of connection screws is passed, that for each through bore, a through bore is arranged in the bearing element, wherein the through bore extends in the bearing element in extension of the respective through bore of the base element and which, starting from the second attachment face, ends in a second clamping face and wherein the first partial number of connection screws is, starting from the connection face, passed through the through bore of the base element and through the through bore in the bearing element and is screwed into the internal threads of a thread body, supported on the second clamping face, that in the flange plate of the base element, through bores are provided, around the longitudinal axis in the area of the first bearing portion, extending parallel to the longitudinal axis and which, starting from the connection face, end in a first clamping face, wherein a second partial number of connection screws is, starting from the connection face, passed through the through bores and is screwed into the internal threads of a thread body, supported on the first clamping face.

15. A flange yoke according to claim 14, characterized in that the first clamping face is formed by a first recess in the outer circumferential face of the base element and that the second clamping face is formed by a second recess in the outer circumferential face of the bearing element.

16. A flange yoke according to claim 14, characterized in that the thread body is formed by a ring, supported on the first clamping face and on the second clamping face and which is split in a plane, which is formed by the longitudinal axis and the first bore axis.

17. A flange yoke comprising:
a base element defining a longitudinal axis and including a flange plate including a first end face and a second end face, a first bearing portion formed integrally with the flange plate and projecting from the first end face of the flange plate and having a first bearing bore defining a first bore axis intersecting perpendicularly the longitudinal axis, a first attachment face provided at the first end face of the flange plate, a first abutment face extending from the first attachment face and arranged on a plane that intersects with its extension the first bore axis, and a connection face that is arranged on the second end face of the flange plate and that is connectable to a mating flange; and
a bearing element having a flange portion that forms a second attachment face that abuts the first attachment face of the base element, and a second abutment face that abuts the first abutment face of the base element, and a second bearing portion having a second bearing bore defining a second bore axis arranged co-axially to the first bore axis, wherein the bearing element is detachably connected by attachment screws to the base element, wherein the first attachment face has a toothing and the second attachment face has a toothing, wherein the toothings engage each other for the transmission of torque around the longitudinal axis.

18. A flange yoke according to claim 17, characterized in that the attachment screws are formed as expansion screws.

19. A flange yoke according to claim 17, characterized in that the flange portion of the bearing element is provided with first blind holes having internal threads that extend parallel to the longitudinal axis, wherein for each blind hole, a first through bore is arranged in the flange plate of the base element that, starting from the connection face, merges in the first attachment face, and wherein first attachment screws are passed through said first through bores and rest in said first blind holes.

20. A flange yoke according to claim 19, characterized in that the first attachment screws have screw ends that are countersunk in the connection face.

21. A flange yoke according to claim 17, characterized in that teeth of the toothing of the first attachment face and teeth of the toothing of the second attachment face extend parallel to the first bore axes.

22. A flange yoke according to claim 17, characterized in that the first abutment face and the second abutment face have, respectively, means for the transmission of forces in the plane of the abutment faces.

23. A flange yoke according to claim 22, characterized in that the first abutment face and the second abutment face have respective toothings that are formed complementary to each other.

24. A flange yoke according to claim 23, characterized in that teeth of the toothing of the first abutment face and teeth of the toothing of the second abutment face extend parallel to the longitudinal axis.

25. A flange yoke according to claim 23, characterized in that teeth of the toothing of the first abutment face and teeth of the toothing of the second abutment face intersect perpendicularly the longitudinal axis with a distance in between.

26. A flange yoke according to claim 17, characterized in that the connection face has means for centering the flange plate relative to a longitudinal axis of the mating flange.

27. A flange yoke according to claim 26, characterized in that the means for centering is formed by a self-centering spur gear.

28. A flange yoke according to claim 17, characterized in that, in the flange plate of the base element, through bores are provided that are equally distributed on a partial circumference around the longitudinal axis in the area of the first attachment face and extend parallel to the longitudinal axis and through which a first partial number of connection screws are passed, and further that for each through bore, a blind hole with internal thread is arranged in the bearing element, wherein the blind holes extend in the extension of the respective through bore of the base element and start from the second attachment face, and wherein the first partial number of connection screws is screwed into the blind holes, and that in the flange plate of the base element, blind holes with internal threads are provided that are equally distributed on the residual partial circumference around the longitudinal axis in the area of the first bearing portion and into which a second partial number of connection screws is screwed.

29. A flange yoke according to claim 17, characterized in that in the flange plate of the base element, through bores are provided around the longitudinal axis in the area of the first attachment face and extending parallel to the longitudinal axis and through which a first partial number of connection screws is passed, that for each through bore, a through bore is arranged in the bearing element, wherein the through bore extends in the bearing element in extension of the respective through bore of the base element and which, starting from the second attachment face, ends in a second clamping face and wherein the first partial number of connection screws is, starting from the connection face, passed through the through bore of the base element and through the through bore in the bearing element and is screwed into the internal threads of a thread body, supported on the second clamping face, that in the flange plate of the base element, through bores are provided around the longitudinal axis in the area of the first bearing portion, extending parallel to the longitudinal axis and which, starting from the connection face, end in a first clamping face, wherein a second partial number of connection screws is, starting from the connection face, passed through the through bores and is screwed into the internal threads of a thread body, supported on the first clamping face.

30. A flange yoke according to claim 29, characterized in that the first clamping face is formed by a first recess in the outer circumferential face of the base element and that the second clamping face is formed by a second recess in the outer circumferential face of the bearing element.

31. A flange yoke according to claim 29, characterized in that the thread body is formed by a ring, supported on the first clamping face and on the second clamping face and which is split in a plane, which is formed by the longitudinal axis and the first bore axis.

* * * * *